US010272372B2

(12) United States Patent
Allott et al.

(10) Patent No.: US 10,272,372 B2
(45) Date of Patent: Apr. 30, 2019

(54) FILTER SYSTEM USING A SELF-VENTING DRAIN

(71) Applicant: Caterpillar Inc., Peoria, IL (US)

(72) Inventors: Mark T. Allott, Mapleton, IL (US); Bryant Alan Morris, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 412 days.

(21) Appl. No.: 14/970,947

(22) Filed: Dec. 16, 2015

(65) Prior Publication Data

US 2017/0173507 A1    Jun. 22, 2017

(51) Int. Cl.
*B01D 36/00*    (2006.01)
*B01D 35/16*    (2006.01)
*B01D 35/00*    (2006.01)
*B01D 35/30*    (2006.01)

(52) U.S. Cl.
CPC ......... *B01D 36/001* (2013.01); *B01D 35/005* (2013.01); *B01D 35/16* (2013.01); *B01D 35/306* (2013.01); *B01D 36/006* (2013.01); *B01D 2201/291* (2013.01)

(58) Field of Classification Search
CPC .... B01D 36/001; B01D 36/006; B01D 35/16; B01D 35/306; B01D 35/005; B01D 2201/291
See application file for complete search history.

(56) References Cited

U.S. PATENT DOCUMENTS

| 2,173,926 | A | * | 9/1939 | Aikman | F16T 1/14 137/188 |
| 4,708,171 | A | | 11/1987 | Cudaback | |
| 5,606,989 | A | | 3/1997 | Roll et al. | |
| 5,996,620 | A | * | 12/1999 | Bensley | B67D 1/0078 137/554 |
| 8,157,997 | B2 | | 4/2012 | Allott et al. | |
| 2008/0308481 | A1 | * | 12/2008 | Wieczorek | B01D 35/153 210/232 |
| 2011/0073537 | A1 | * | 3/2011 | Allott | B01D 35/153 210/232 |
| 2012/0024771 | A1 | | 2/2012 | Abdalla et al. | |
| 2013/0269533 | A1 | | 10/2013 | Rathod et al. | |
| 2015/0202552 | A1 | | 7/2015 | Allott et al. | |
| 2015/0238883 | A1 | | 8/2015 | Jokschas et al. | |

FOREIGN PATENT DOCUMENTS

| DE | 112008001571 | 7/2010 |
| GB | 2109901 | 6/1983 |

* cited by examiner

*Primary Examiner* — Krishnan S Menon
*Assistant Examiner* — Waqaas Ali
(74) *Attorney, Agent, or Firm* — Law Office of Kurt J. Fugman LLC (57) ABSTRACT

A filter element is provided that has a generally cylindrical configuration and that defines a longitudinal axis and a radial direction. The filter element comprises a center tube that defines a central reservoir and that includes annular filter media surrounding the center tube and the central reservoir, an open end joined to the center tube disposed along the longitudinal axis, the open end including an opening allowing fluid to flow from the central reservoir to the outside of the filter element, and a closed end joined to the center tube opposite the open end disposed along the longitudinal axis, the closed end including an end cap comprising a body that defines an attachment pocket and an air pocket that surrounds the attachment pocket.

20 Claims, 7 Drawing Sheets

FILTER SYSTEM USING A SELF-VENTING DRAIN

TECHNICAL FIELD

The present disclosure relates generally to a drain for a housing. More specifically, the present disclosure relates to a liquid filter housing drain with an integral air vent.

BACKGROUND

Liquid filter drains are known for draining filter housings of accumulated contaminants. In diesel engines, for example, a fuel line filter is used to separate out water and debris. These contaminates accumulate in a lower portion of the filter housing.

Figure 1:
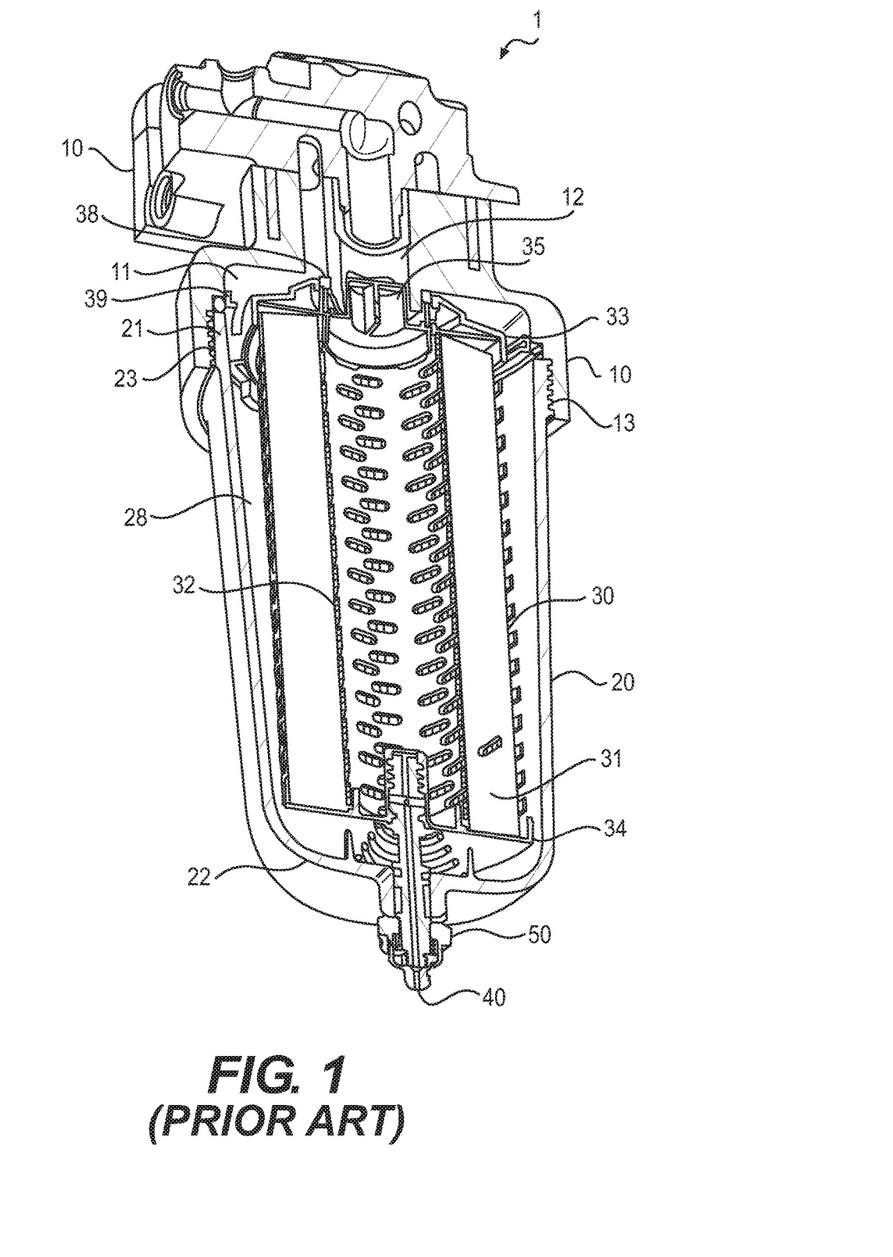
FIG. 1 is a perspective cross-sectional view of a filter assembly that includes a filter base, canister, filter element and a drain as is known in the art.

For example, FIG. 1, which is taken from U.S. Pat. No. 8,157,997, the contents of which are incorporated by reference herein for all purposes in its entirety, illustrates a canister filter system 1 having a base 10, a canister 20, and a filter element 30. The general construction and use of a canister filter system is understood by those of ordinary skill in this art. Thus, all the details of the construction and use of canister filter system 1 need not be explained here. The canister filter system 1 may be used to filter fluids such as diesel or gasoline or other liquid fuels, lubrication oil, hydraulic fluid for hydraulic power systems, transmission fluid, or even possibly intake air for an engine. The canister filter system 1 may also be used as a fuel/water separator filter. The canister filter system 1 with the features described herein could be adapted by those of ordinary skill in this art to serve many different purposes and suit many other applications.

The base 10 includes an inlet channel 11 for fluid inlet into the canister filter system 1, and an outlet channel 12 for fluid outlet from the canister filter system 1. The base also includes base threads 13. Other attachment structure than threads may be used.

The canister 20 includes an open end 21 and a closed end 22. Adjacent the open end 21 are canister threads 23 which can be engaged with base threads 13 to hold the canister 20 to base 10. Threads are one example of engagement structures which may be included on the base 10 and canister 20 to form a releasable engagement. Other engagement structures may be used as will be recognized by those of ordinary skill in this art.

The filter element 30 may take many different forms to suit a particular application. In the illustrated embodiment, the filter element 30 is well suited for filtering fuel or lubrication oil. The filter element 30 may include annularly arranged filter media 31 circumferentially surrounding a central reservoir defined by center tube 32. Axial ends of filter media 31 are sealed by end plates. Open end plate 33 defines an axial open end of filter element 30. The open end plate 33 is termed "open" because it includes an opening 35 for allowing passage of fluid to outlet channel 12 from the central reservoir defined by center tube 32. Closed end plate 34 defines an axial closed end of filter element 30. The closed end plate 34 is termed "closed" because it prevents any fluid outside the filter element 30 adjacent axial end of filter media 31 from flowing unfiltered into center tube 32. Open end plate 33 and closed end plate 34 may each be joined to the center tube 32 via welding, adhesives, etc. Alternatively, several or all of center tube 32, open end plate 33, and closed end plate 34 may be constructed as unitary components.

Fluid to be filtered enters from the inlet channel 11 and flows to the annular cavity 28 between canister 20 and filter media 31. The fluid then passes into and through filter media 31, then into center tube 32 through the perforations shown therein in FIG. 1. The fluid exits center tube 32 through open end plate 33 and opening 35 into the outlet channel 12. The open end plate 33 and closed end plate 34 help define the fluid channels into and out of filter media 31, preventing any fluid from flowing directly to outlet channel 12 and bypassing filter media 31. First and second annular seals 38 and 39 may advantageously be included on filter element 30 and also help define and seal fluid passageways into and out of filter element 30. First annular seal 38 may be included on the open end plate 33 around opening 35 and adjacent the axial open end of filter element 30 to help seal the inlet channel 11 from the outlet channel 12. Second annular seal 39, larger in diameter than first annular seal 38, may be formed circumferentially around the open end plate 33 to provide the seal between canister 20 and base 10, or in other words provides a seal to prevent fluid in inlet channel 11 from leaking out of the joint between canister 20 and base 10. First and second annular seals 38, 39 may be integrally formed with open end plate 33, or attached with adhesives or other methods, as is known in this art. When first and second annular seals 38, 39 are integrally formed on or included on open end plate 33, proper replacement of these seals is assured when the filter element is replaced at proper intervals. Otherwise, a technician may fail to properly replace the seals at appropriate intervals, which could result in leakage out of the system, or leakage within the system allowing unfiltered fluid to bypass the filter element 31 and lead to contamination.

The filter element may have a generally cylindrical configuration that defines a longitudinal axis and a radial direction. Other configurations are possible.

A drain is typically disposed at the bottom of the filter housing and opened via some type of threaded connection. However, the filter assembly and filter line connected to the filter assembly is generally otherwise a closed system. Without a vent to replace outgoing fluid and contaminants with air, the contaminants either do not flow out of the housing or, if they do, they exit the drain inefficiently in spurts.

Figure 2:
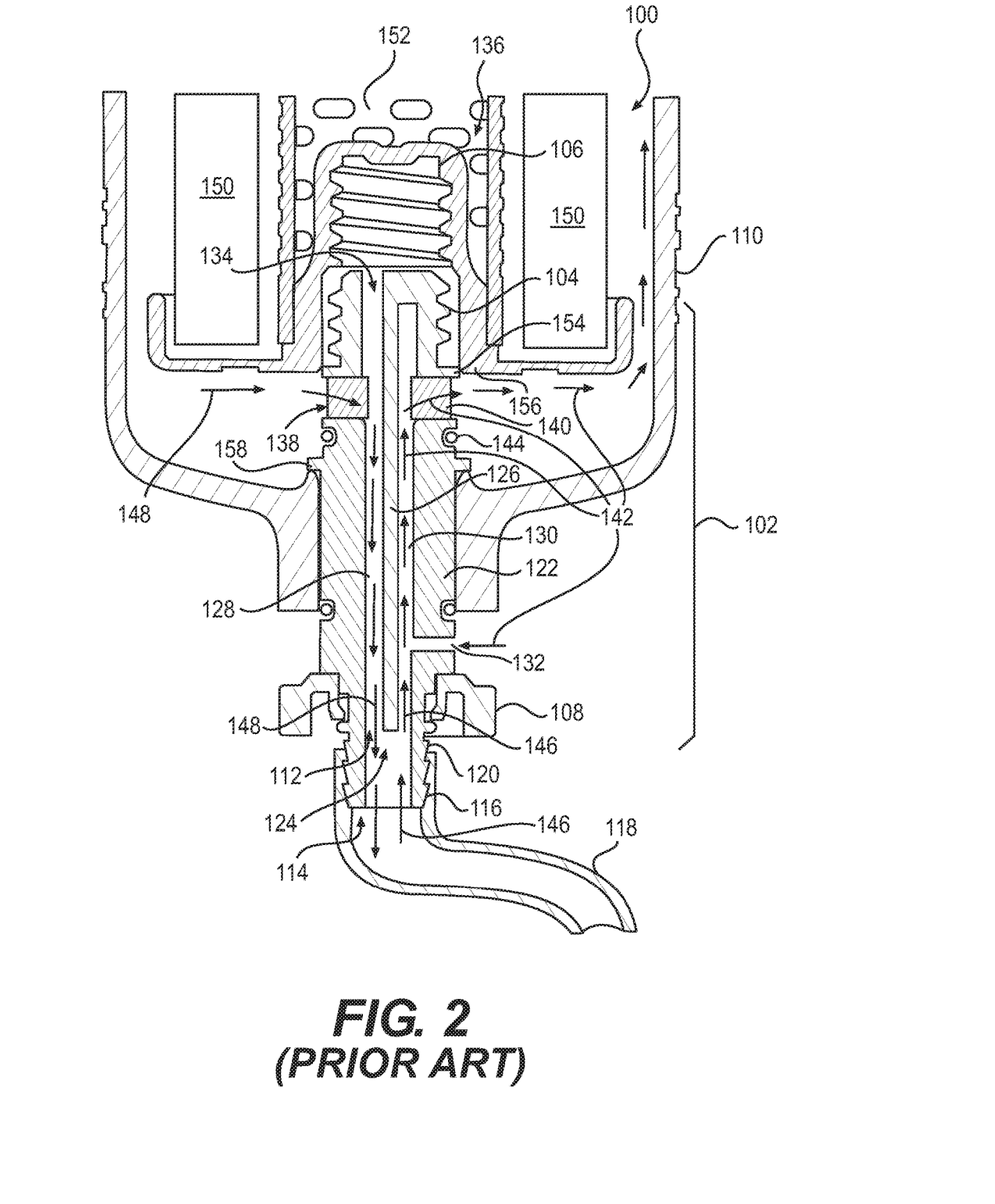
FIG. 2 is front sectional view of a drain design used with a filter assembly similar to that shown in FIG. 1 as is known in the art.

For example, FIG. 2 which is taken from U.S. Pat. Application Publication No. 2015/0202552, the contents of which are incorporated by reference herein for all purposes in its entirety, is a cross-sectional view taken axially through a filter housing assembly 100 with a drain valve assembly 102 in an open conformation, that is similar in nature to that disclosed in FIG. 1 although not exactly the same. The filter itself includes a porous filtering medium 150 and defines central chamber or space 152. As shown in FIG. 2, the drain valve assembly 102 is opened in response to the threaded stem portion 104 being unmated with the threaded filter portion 106. To open the drain valve assembly 102, the valve stem 104 may be rotated via a user or other service technician rotating a knob 108. The knob 108 is affixed to the valve stem 104.

Once the drain valve assembly 102 is opened, a series of passages for the release of fluid and the ingress of air are opened between the interior of the housing or canister 110 and the outside. These opening includes a drain outlet 112 disposed at the end of the second end 114. To facilitate collecting the fluid as well as an incidental amount of fuel, the drain outlet 112 includes a fitting 116 for a tube 118. In this regard, the filter housing assembly 100 is often disposed within the body of a machine and relatively close to the power source of the machine. In order to prevent fluid from the drain outlet 112 spilling into the machine or onto the power source, the tube 118 may be fitted to the fitting 116 and run to a desired location such as a waste receptacle. To help secure the tube 118 to the fitting 116, the fitting 116 may include one or more barbs 120 or other such structure such as ridges, grooves, or the like.

To continue, the body 122 has an axial passage 90 disposed therethrough. The axial passage 124 has a divider 126 disposed axially along at least a portion thereof. The divider 126 separates the axial passage 124 into an outlet passage 128 and a vent passage 130. In various examples, the divider 126 extends the entire length of the axial passage 124 or a portion of the length of the axial passage 124. In the particular example shown, the divider 126 extends a portion of the length of the axial passage 124 and stops at about the beginning of the fitting 116. However, in general, the divider 126 does extend past a vent side passage 132 the axial passage 124. This vent side passage 132 is configured to allow air into the vent passage 130 while reducing or preventing liquid from exiting out of the vent side passage. It is an advantage that this vent side passage 132 is distinct from the drain outlet 112 because fitting the tube 118 to the fitting 116 may otherwise reduce the ability of vent gases to travel back up through the drain outlet 112.

To continue, the outlet passage 128 is open at an inlet 134 disposed at the first end 136, at the drain outlet 112 and at a first side passage 138. The vent passage 130 is closed at the first end 136 in order to help direct the flow of vent gases into the housing 110 via a second side passage 140 as shown by a plurality of air flow arrows 142. The vent passage 130 is also open at the drain outlet 112 and the vent side passage 132. In operation, unscrewing the valve stem via the knob 108 unthreads the threaded stem portion 104 from the threaded filter portion 106. As the valve stem 104 moves downward or outward from the housing 110, the upper seal 144 is opened and the first and second side passages 138 and 140 are drawn down into the lower portion of the housing 110 where the fluid has collected.

Gravity works to urge the fluid into the first and second side passages 138 and 140 and a small vacuum pressure then draws air into the vent side passage 132, up the vent passage 130 and out the second side passage 140 to enter the housing 110 as shown by the air flow arrows 142. The replacement vent air then allows the fluid to continue flowing into the first side passage 138, down the outlet passage 128 and out the drain outlet 112 as shown by a plurality of fluid flow arrows 142. Of note, if vent gas is available to be drawn up from the drain outlet 112, this vent gas is drawn up along the vent passage 130 as shown by the air flow arrows 146. In addition, at all times and particularly near the end of the draining process, the second side passage 140 and vent passage 130 are available for draining fluid. This dual functionality of the vent passage 130 is self-regulated in response to the amount of vent gas needed to replace outgoing fluid and increases the efficiency with which the fluid exits the housing 110. While air is flowing into the housing, the liquid and its contaminants flow out of the housing. This flow is designated by arrows 148.

Figure 3:
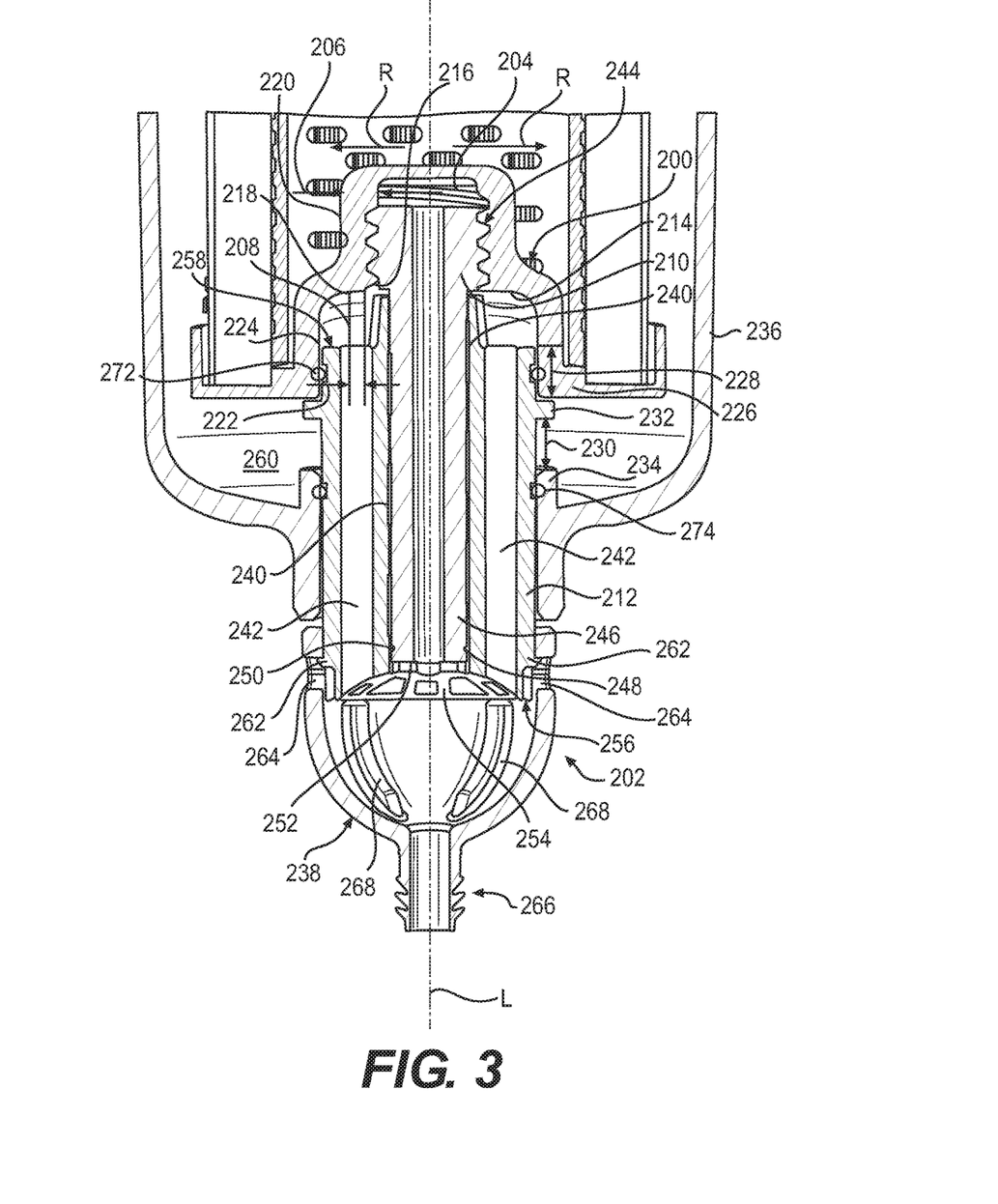
FIG. 3 is front sectional view of an endcap for a filter element and a drain assembly according to an embodiment of the present disclosure.

However, it has been found that the design of FIG. 3 still needs further improvement in order to break the vacuum to facilitate drainage. It should be noted that at no time does the space around the threaded portion of the stem 104 have substantial fluid communication with the interior of the housing as ledge 154 of the stem portion 104 never drops below the bottom end plate 156. This is prevented as the bottom ledge 158 of the drain assembly abuts the housing 110 first.

Other different ways of providing the necessary venting have been previously devised. One such example is the use of removable plugs at the top of the base of the filter assembly. However, this design has two drawbacks. First, this design does not allow for the efficient draining of higher viscosity liquids such as diesel fuel. Also, the drain time can be very slow as there is no way of breaking the vacuum when the liquid flows out of the closed system.

Another solution has been to add a vent plug to the filter base but this adds additional cost. In the field, maintenance technicians often loosen a fluid line that is attached to the filter base to provide venting. However, this may inadvertently lead to a technician forgetting to reattach the fuel line, which can result in a leak.

For all the above reasons, it is desirable to develop a better method for venting a filter housing than has been previously devised.

SUMMARY OF THE DISCLOSURE

A filter element is provided that has a generally cylindrical configuration and that defines a longitudinal axis and a radial direction. The filter element comprises a center tube that defines a central reservoir and that includes annular filter media surrounding the center tube and the central reservoir, an open end joined to the center tube disposed along the longitudinal axis, the open end including an opening allowing fluid to flow from the central reservoir to the outside of the filter element, and a closed end joined to the center tube opposite the open end disposed along the longitudinal axis, the closed end including an end cap comprising a body that defines an attachment pocket and an air pocket that surrounds the attachment pocket.

A canister filter system is provided that comprises a canister that includes an open end and a closed end, a drain that penetrates through the closed end of the canister and that includes attachment structure and a filter element that has a generally cylindrical configuration and that defines a longitudinal axis and a radial direction. The filter element comprises a center tube that defines a central reservoir and that includes annular filter media surrounding the center tube and the central reservoir, an open end joined to the center tube disposed along the longitudinal axis, the open end including an opening allowing fluid to flow from the central reservoir to the outside of the filter element, and a closed end joined to the center tube opposite the open end disposed along the longitudinal axis, the closed end including an end cap comprising a body that defines an attachment pocket and an air pocket that surrounds the attachment pocket.

DETAILED DESCRIPTION

Focusing now on FIG. 3, an embodiment of an end plate or end cap 200 and filter drain assembly 202 according to one embodiment of the present disclosure is shown in a closed configuration. The filter element has a generally cylindrical configuration that defines a longitudinal axis L and a radial direction R. The end cap 200 includes an attachment pocket 204 at its furthermost extent in the axial direction along the longitudinal axis L of the filter element. The body includes a nominal wall 206 that forms the attachment pocket 204 of the end cap 200 jogs in the radial direction R of the filter element, forming an air pocket 208 that surround the stem member 210 and barrel member 212 of the drain assembly 202. The air pocket 208 is not substantially filled by any component of the drain assembly even when the drain assembly is in the closed configuration. Put another way, the air pocket is at least partially empty and is not filled with a component or a fluid other than air when the drain is in the closed configuration.

Focusing closely at the end cap, it includes a body that includes a nominal wall 206 that defines an attachment pocket 204 and an air pocket 208 that surrounds the attachment pocket 204. The air pocket 208 is partially defined by a base surface 214 that begins at the termination of the thread profile 216 and extends in an outwardly radial direction R and terminates a predetermined distance such that this termination point 218 is substantially aligned radially with the outside surface 220 of the attachment portion of the end cap 200. The length 222 of the base surface 214 measured in the radial direction R may be at least 75% of the nominal wall thickness.

Similarly, the nominal wall of the end cap jogs a distance in the radial direction that is at least as great as the nominal wall thickness 206 as the wall transitions from the attachment pocket 204 to the air pocket 208. This results in the inside surface 224 of the air pocket being positioned further away from the longitudinal axis L in the radial direction R than the outside surface 220 of the wall that is adjacent the threaded portion of the end cap. The wall then extends from around the air pocket in a downward axial direction along the longitudinal axis L of the filter element and terminates in a bottom end plate 226.

Furthermore, the depth of the air pocket 208 in the axial direction along the longitudinal axis L is greater than the amount of protrusion 228 of the barrel member 212 of the drain assembly past the bottom end plate 226 of the end cap 200. Furthermore, this amount of protrusion 228 is less than the distance 230 from the ledge or stop 232 of the barrel member 212 to an abutment feature 234 of the canister 236 when the drain is in the closed configuration. This is advantageous when opening the drain assembly as will be discussed in more detail later herein.

Focusing now more on the drain assembly of FIG. 3, it includes a barrel member 212 that is concentrically disposed about the stem member 210 and a funnel member 238 that is attached to the barrel member 212. All of these components share the same longitudinal axis and radial direction as the filter element and the end cap as already described. The barrel member 212 defines vent passages 240 that surround the central or longitudinal bore of the barrel member and liquid flow passages 242 that surround the vent passages 240 in a concentric spatial relationship. The stem member 210 includes an attachment end 244 that in this case is a threaded end that extends from a shaft portion 246 that extends into the central bore of the barrel member 212. The stem member 210 defines a retaining groove 248 near its bottom end for receiving a retaining member 250 of the barrel member 212 as will be discussed shortly. The free end 252 of the shaft 246 of the stem member 210 stops short of a concave surface 254 proximate the end 256 of the barrel member 212 that is opposite the end 258 that is adjacent the attachment end 244 of the stem member. Other attachment structures for the stem and the associated attachment pocket of the end cap other than threads are possible.

The spatial relationship between the vent passage 240 and the liquid flow passage 242 may be described as being spaced away from the longitudinal axis L along the radial direction R on the same side of the longitudinal axis L, that is to say, the vent passage 240 and the liquid flow passage 242 are adjacent each along the same radial direction R that extends from the longitudinal axis L. Also, the vent passage 240 is positioned between the longitudinal axis L and the liquid flow passage 242 along a radial direction R. Other arrangements are possible. Also, designs that are not symmetrical or that use one or more vent passages and one or more liquid flow passages are considered to be within the scope of the present disclosure.

Furthermore, the canister 236 may define a liquid reservoir 260 and the liquid flow passage 242 may be positioned between the vent passage 240 and the liquid reservoir 260 in the radial direction R on the same side of the longitudinal axis L.

A funnel member 238 is attached to the bottom portion of the drain assembly. More specifically, the funnel collection member 238 includes at least one and preferably four apertures on its side surface (only two are shown in FIG. 3), that serve dual purposes. First, they provide a catch point for the snap portions 262 of the barrel member 212 to retain the funnel member 238 onto the barrel member 212. Second, these apertures provide side vent passages 264 that allow the ingress of air to the vent passages from the environment. A barbed connection or other hose attachment structure 266 is provided at the bottom of the funnel member to allow the attachment of a hose for draining fluid. Ribs 268 are also shown that extend from the interface with the barrel member down toward the main outlet passage 270 of the funnel member. The top surfaces of the ribs 268 prevent downward movement of the barrel member 212 further into the funnel member 238 but allow enough space for the snap members 262 of the barrel member 212 to engage the surfaces that define the aperture 264 of the funnel member 238.

An upper seal 272 between the drain assembly and the end cap of the filter element is provided that prevents the leaking of air into the liquid reservoir located at the bottom of the canister. Of course, the opposite is also true, that is to say, the upper seal prevents the seeping of liquid into the air pocket. The lower seal 274 prevents the leaking of air from the environment into the liquid in the canister while also preventing the leaking of liquid from the canister to the environment.

It should be noted that other than the adjustment to the end cap and the drain assembly, the construction of all the embodiments herein are similar to some of those known in the art including those discussed above with reference to FIGS. 1 and 2. Therefore, the embodiments discussed herein with respect to the drain assembly below and the end cap above may be used with some of the filter assemblies and filter elements known in the art including those discussed with reference to FIGS. 1 and 2 above and may have some of the same features.

Figure 4:
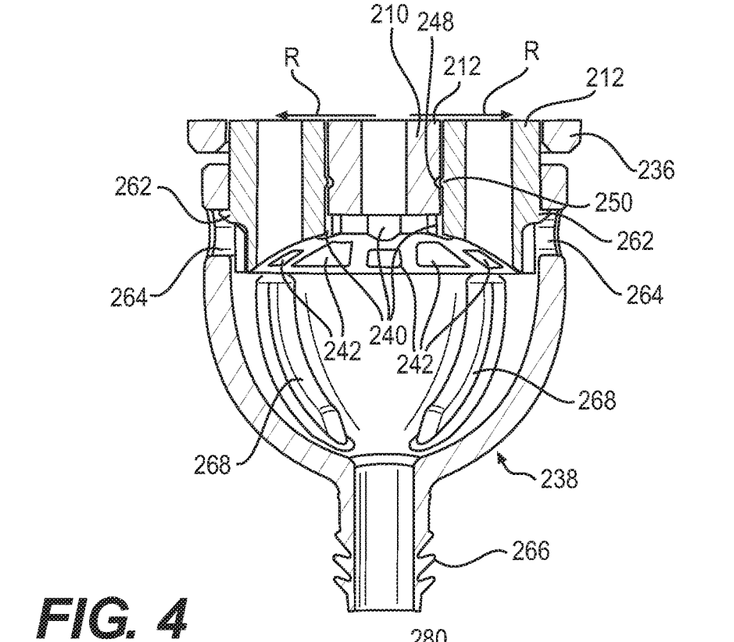
FIG. 4 is an enlarged detail view showing the collection funnel with the hose attachment of the drain assembly of FIG. 3 with more clarity.

FIG. 4 shows more clearly that snap features 250 are included that are disposed in the central bore of the barrel member 212 that engage the retaining groove 248 of the stem member 210. The barrel member 212 defines at least one vent passage 240 and at least one liquid flow passage 242 and the funnel member 238 defines one side vent opening 264 and the liquid flow passage 242 is positioned between the side vent opening 264 and the vent passage 240 along the radial direction R. The funnel member 238 is configured to collect the flow from a plurality of liquid flow passages 242 of the barrel member 212 when they are present.

Figure 5:
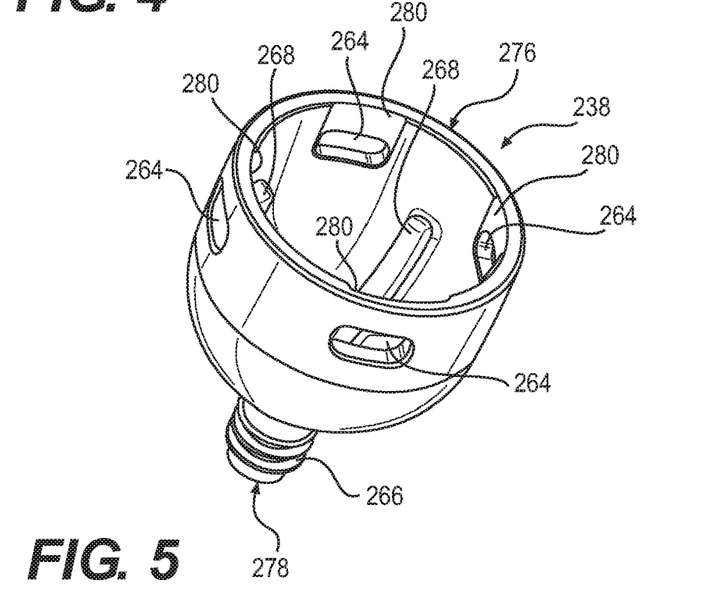
FIG. 5 is a top perspective view of the collection funnel of FIG. 4 shown in isolation from the drain assembly.

Looking now at FIG. 5, it illustrates a top perspective view of the funnel member 238. The funnel member 238 includes a first end 276 that defines an opening that is configured to be in fluid communication with the stem member 210 and the barrel member 212, a second end 278 that includes hose attachment structure 266, and a side wall that extends from the first end to the second end. Ribs 268 are disposed in the interior of the funnel member 238 that abut the barrel member 212 as the funnel member 238 is attached to the barrel member 212.

FIG. 5 also shows more clearly the construction of the windows or apertures 264 that serve the dual purposes of retaining the funnel member 238 onto the barrel member 212 and to provide a source of venting air, in other words, they also act as vent openings. A plurality of these is shown but it is contemplated that only one may be needed in some embodiments. On top of each window 264, a depression 280 is provided that fixes the relative angular position of the funnel member to the barrel member. Once the snaps of the barrel member are aligned with these depressions, there is a natural resistance to any rotation of the funnel member relative to the barrel member as the funnel member is snapped onto the guide member. Once the snaps are in place in the windows, any rotation of the funnel member is imparted to the barrel member as the snaps push on the sides of the windows. This, in turn, provides some rotation to the stem member in a manner that will be discussed later herein. Also, the depressions may aid in molding the windows successfully into the funnel member.

Figure 6:
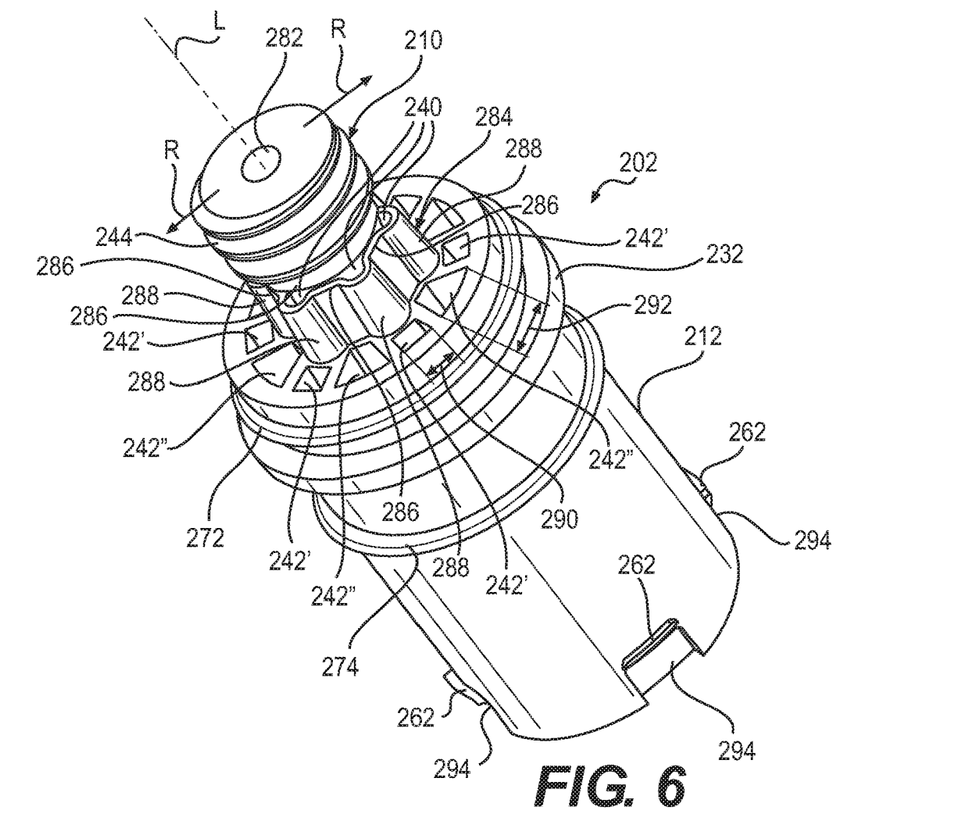
FIG. 6 is a top oriented perspective view of the drain assembly of FIG. 3 with the collection funnel removed showing the openings of the liquid drain passages, the openings of the air vent passages, and the partition that separates them clearly. The drain assembly is shown in a closed configuration.
Figure 7:
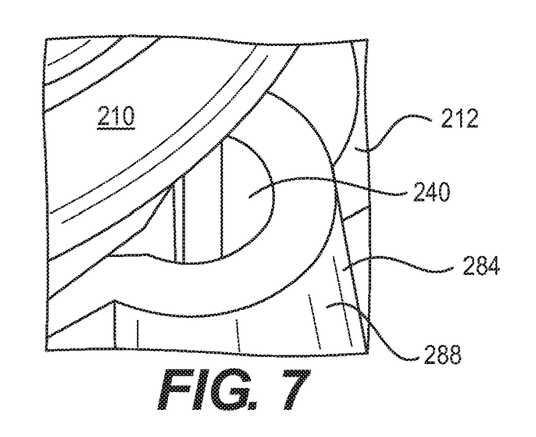
FIG. 7 is an enlarged detail view of one of the openings of the liquid drain passages of FIG. 6.

FIG. 6 shows a perspective view of the drain assembly 202 without the funnel member. The stem member 210 includes a central or longitudinal bore 282 that may provide additional venting as will be discussed in more detail later herein. A raised partition 284 separates the vent passages 240 from the liquid passages 242 in the barrel member (see also FIG. 7). The partition 284 includes alternating straight sections 286 and curved sections 288 along the perimeter of the partition. The partition creates an obstruction that helps the vent passages from being filled with liquid during the draining process as will be shown more clearly later herein. The elevation of the air paths above the liquid drain paths creates a hydrostatic pressure differential between the air and the liquid. The liquid flow passages 242 have an alternating pattern of large and small passages that form a circular array about the longitudinal axis of the drain assembly. Alternatively, this may be described as having two liquid flow passages 242 that are adjacent to each other that are defined by differently configured perimeters. The maximum dimension 290 of the small passages is less than the maximum dimension 292 of the large passages. As a result, the smaller rectangular passages 242' alternate between acting as air or liquid passages while the larger trapezoidal passages 242" exhibit full flow fluid only.

Figure 8:
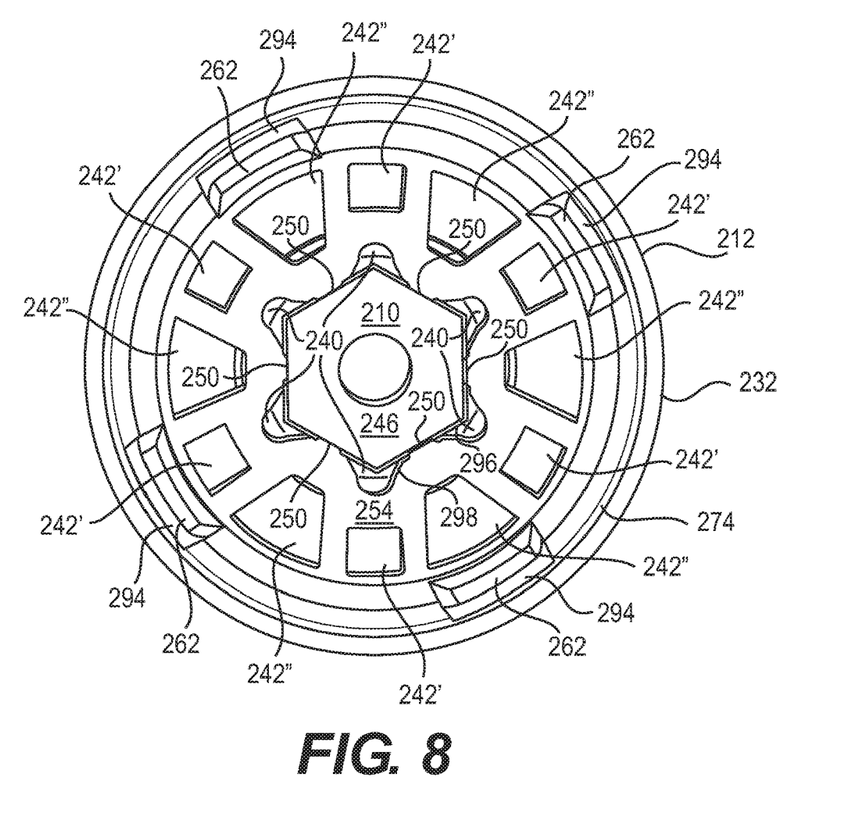
FIG. 8 is a bottom view of the drain assembly of FIG. 6.

As shown, six vent passages 240 are provided while twelve liquid passages 242 are provided (see also FIG. 8). The stem member 210 and barrel member 212 are shown to be separate members made by an injection molding process but it is contemplated that they could be made as one piece or by another process, etc. The number and configuration of any of the passages may be altered as desired. For example, the perimeter of the liquid flow passages may be circular or have any suitable polygonal shape, etc.

The spatial relationship of the vent passages 240 and liquid flow passages 242 may be described as follows. As already mentioned, the barrel member 212 is concentrically disposed about the stem member 210. A plurality of vent passages 240 form a circular array about the longitudinal axis L and a plurality of liquid flow passages 242 form a circular array about the array of vent passages and the longitudinal axis L. There are also a plurality of liquid flow passages 242 and vent passages 240 that are spaced away from the longitudinal axis L along the same radial direction R that extends from the longitudinal axis L.

The configuration of the barrel member 212 may also be described as having a first end 258 that is proximate the threaded end 244 of the stem 210 and a second end 256 that is arranged in an opposing fashion to the first end along the longitudinal axis L. The partition 284 extends from the first end and an anti-capillary flow feature is present on the second end as will be described in more detail shortly. The first end of the barrel member defines one or more entrances for the liquid flow passage(s) (located where reference numerals 242' and 242" point in FIG. 6) and one or more exits for the vent passage(s) (located where reference numerals 240 point in FIG. 6) and a partition 284 extends from the first end and separates the entrance of one liquid flow passage from the exit of the vent passage. The vent passages and liquid flow passages of the barrel member all run solely along the longitudinal axis L. This helps to allow fluid to drain from the air pocket when the drain is opened and closed as there is no tendency for the liquid to sit in a horizontal or radial oriented bore that may leak back into the air pocket.

Other features of the drain assembly can also be seen in FIG. 6 including the upper and lower seals 272, 274 that are positioned on either side of the ridge that provides a stop 232 for limiting the movement of the drain assembly relative to the filter element when closing the drain assembly and the canister when opening the drain assembly. Four snap features 262 are provided (only three are shown in FIG. 6), that are used to snap on the funnel member. Depressions or cut-outs 294 are provided directly beneath the snap features that facilitate the molding of those features.

FIG. 8 shows the bottom of the barrel member 212 and stem member 210. The concave surface 254 that is proximate to the vent and fluid passages 240, 242 of the barrel member and that defines the perimeters of the entrances of the vent passages (where reference numerals 240 point in FIG. 8) and exits of the fluid passages (where reference numerals 242' and 242" point in FIG. 8) can also be seen. The perimeter of the shaft portion 246 of the stem member 210 has a hexagonal configuration but other configurations are possible. The hexagonal perimeter 296 mates with a partially complimentary perimeter of the central bore of the barrel member, that serves as drive structure 298. This perimeter includes undulations that tangentially contact the surfaces of the hexagonal perimeter of the shaft of the stem member and that provide clearance areas proximate the corners where these surfaces meet. These clearance areas also serve as the air vent passages 240 and are partially defined by a circular perimeter. Other configurations are possible. The lower seal 274, ridge 232, snap features 262 and associated cut-outs 294 for those snap features of the barrel member can also be seen. The snap features 250 the barrel member that engage the retaining groove of the stem member can also be slightly seen.

Figure 9:
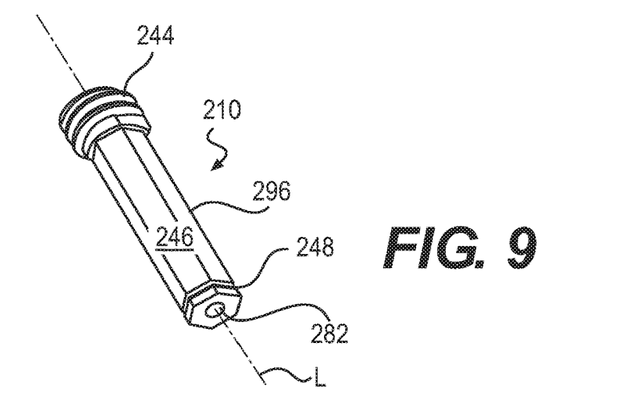
FIG. 9 is a perspective view of the stem member isolated from the drain assembly of FIG. 6.

Referring now to FIG. 9, the stem member 210 may be seen in a perspective view in isolation. The hexagonal perimeter 296 of the shaft portion 246, the threaded portion 244, the retaining groove 248, and the exit of the longitudinal bore 282 can be seen. The central or longitudinal bore 282 is concentric with the longitudinal axis L but this may not be true for other embodiments.

Figure 10:
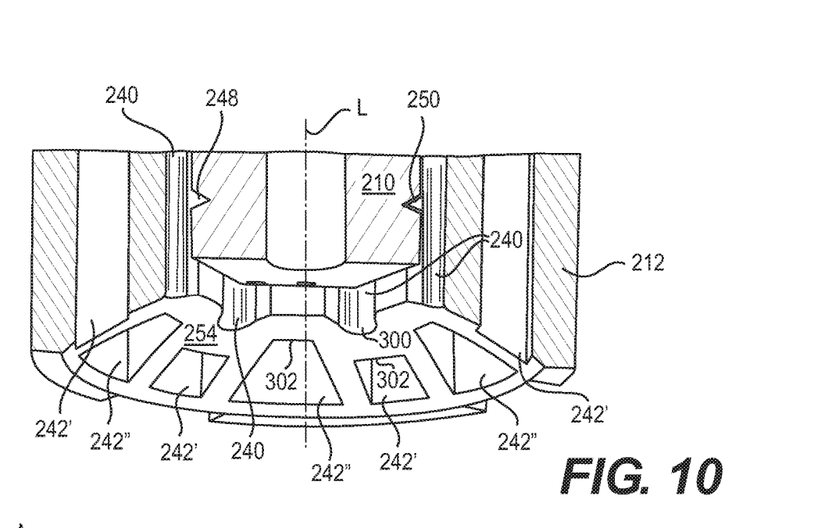
FIG. 10 is an enlarged sectional view of the drain assembly of FIG. 6 to more clearly show the bottom surface of the barrel member of the drain assembly.

FIG. 10 shows an enlarged sectional view of the drain assembly with the funnel member removed. The concave surface 254 proximate the ports of the liquid and vent passages 242, 240 can be seen. The concave surface helps to keep drain liquids from blocking the air vent passages. Without this feature, capillary action may allow a portion of the draining liquid to flow towards the air vent passages. More viscous liquids may frequently block or restrict the air vent passages. As a result, the liquid may drain in an undesirable stop/start fashion. The concave shape discourages the capillary flow toward the air vent passages and creates a continuous flow of liquid.

Any surface may serve this end provided some change in elevation or height is achieved between the liquid flow passages and the vent air passages. Another feature that discourages or limits the capillary flow from the exit of the liquid flow passage toward the entrance of the vent passages such as partitions or ribs, etc. may also be used. When a changed in elevation is used, it is desirable that the lowest point 300 of the entrance of the vent passage is higher along the longitudinal axis L than the highest point 302 of the exit of the liquid flow passage. A snap feature 250 of the barrel member 212 engaging the retaining groove 248 of the stem member 210 can also be seen.

INDUSTRIAL APPLICABILITY

Figure 11:
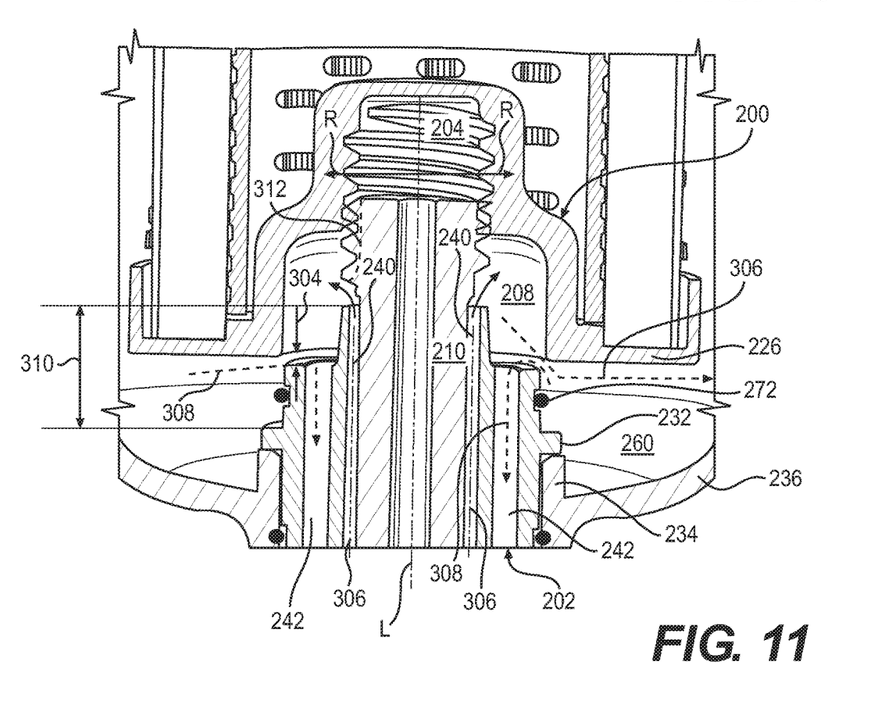
FIG. 11 is a sectional view of the drain assembly of FIG. 6 in an open or draining configuration.

In practice, the drain assembly is rotated until it reaches a closed configuration as shown in FIG. 3 via the threaded connection between the end cap 200 of the filter element and the stem 210 of the drain assembly. After enough time has passed or enough contaminates have settled at the bottom of the liquid reservoir 260 of the canister 236 necessitating draining, the drain assembly 202 is rotated in the opposite direction until its stop ledge 232 hits an abutment feature 234 of the canister 236 as shown in FIG. 11. This rotation is created by grabbing the funnel member 238 shown in FIG. 3 manually and turning the entire assembly. This may be facilitated by providing knurling on the outer surface of the funnel member for grip. Alternatively, a tool interface such as a hexagonal feature may be added to the outside surface of the funnel member to help make this rotation.

As the drain assembly 202 is rotated to reach its draining or open configuration as shown in FIG. 11, the upper seal 272 will drop below the bottom member 226 of the end cap 200, allowing a relatively large volume of air to exit the air pocket 208 immediately to break the vacuum and start the draining of liquid through the drain assembly. The close proximity of the air pocket to the vent passage 240 and liquid draining passage 242 is helpful in creating the proper flow. As shown in FIG. 11, once the drain assembly bottoms out on the abutment feature 234 of the canister 236, a small gap 304 is created that allows the flow of air, designated by arrows 306 into the liquid reservoir at the bottom of the canister. At the same time, liquid may flow, represented by arrows 308, from the liquid reservoir a very short distance to the liquid flow passage 242 without blocking the air vent passage 240 due in part to the partition 284.

More specifically, drain 202 includes a stop 232 that is configured to contact the end cap 200 when closed (see FIG. 3) and contact the canister 236 when opened (see FIG. 11) and the distance 230 from the stop to the canister along the longitudinal axis L when in the closed configuration (see FIG. 3) is more than the distance 228 from the stop to the entrance of a fluid flow passage along the longitudinal axis (see FIG. 3). As shown in FIG. 11, the difference between the distances defines a gap 304 between the drain and the end cap measured along the longitudinal axis L. Also, the height 310 of the partition measured along the longitudinal axis L from the stop member to the top of the partition is greater than the distance 230 from the stop member to the canister when the drain is in the closed configuration. As a result, the partition and exits of the vent passages always remain up in the air pocket even when the drain is in the open configuration as illustrated in FIG. 11. Hence, these passages are not blocked as liquid flows down into the liquid flow passages.

In particular, the following spatial relationship between the air pocket 208 and the air vent passage 240 and the liquid flow passage 242 is useful. The air pocket is in direct fluid communication with the liquid flow drain passage, the liquid reservoir to be drained, and the air vent passage once the drain assembly is rotated into an open or draining configuration. Also, the air vent passage is in communication with the air pocket at a point that is above the liquid reservoir and the liquid drain passage along the longitudinal axis L. The liquid drain passage is located closer to the liquid reservoir to be drained than the air vent passage along the radial direction R.

Also, when the stem member 210 is fully retracted from the threaded portion 204 of the end cap 200, the central bore 282 of the stem member may also provide additional air venting as it is in fluid communication with the air pocket 208. This may be achieved by providing a groove 312 through the threads so that there is fluid communication between the attachment pocket 204 and the air pocket 208. Alternatively, the stem could be configured to be backed all the way out of the attachment pocket 204 as shown in FIG. 2. This central bore may not be necessary in all embodiments but may be useful for those embodiments that are used with high viscosity fluids. Conversely, when the bore of the stem is able to provide enough venting, it is contemplated that the vent passages of the barrel member may be omitted.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A filter element that has a generally cylindrical configuration and that defines a longitudinal axis and a radial direction, the filter element comprising:
    a center tube that defines a central reservoir and that includes annular filter media surrounding the center tube and the central reservoir;
    an open end joined to the center tube disposed along the longitudinal axis, the open end including an opening allowing fluid to flow from the central reservoir to the outside of the filter element; and
    a closed end joined to the center tube opposite the open end disposed along the longitudinal axis, the closed end including an end cap comprising:
        a body that defines an attachment pocket and an air pocket that surrounds the attachment pocket in an outward radial direction and the body of the end cap includes a nominal wall that defines an outside surface that is adjacent the attachment pocket and an inside surface that is adjacent the air pocket and the inside surface of the air pocket is spaced further away from the longitudinal axis than the outside surface along the radial direction.

2. The filter element of claim 1 wherein the attachment pocket is spaced away in the axial direction along the longitudinal axis from the air pocket.

3. The filter element of claim 1 wherein the nominal wall defines a nominal wall thickness and the nominal wall jogs in the radial direction as the wall transitions from the attachment pocket to the air pocket a distance that is at least as great as the nominal wall thickness.

4. The filter element of claim 1 wherein the nominal wall defines a thickness and a base surface that partially defines the air pocket wherein the base surface extends in the radial direction from the attachment pocket and terminates at a point and the length of the base surface in the radial direction is at least 75% the nominal wall thickness.

5. The filter element of claim 1 wherein the attachment pocket is threaded.

6. A canister filter system comprising:
    a canister that includes an open end and a closed end;
    a drain that penetrates through the closed end of the canister and that includes attachment structure, and
    a filter element that includes a generally cylindrical configuration and that defines a longitudinal axis and a radial direction, the filter element comprising:
        a center tube that defines a central reservoir and that includes annular filter media surrounding the center tube and the central reservoir;
        an open end joined to the center tube disposed along the longitudinal axis, the open end including an opening allowing fluid to flow from the central reservoir to the outside of the filter element; and
        a closed end joined to the center tube opposite the open end disposed along the longitudinal axis, the closed end including an end cap comprising:
            a body that defines an attachment pocket and an air pocket that surrounds the attachment pocket in an outward radial direction and the body of the end cap includes a nominal wall that defines an outside surface that is adjacent the attachment pocket and an inside surface that is adjacent the air pocket and the inside surface of the air pocket is spaced further away from the longitudinal axis than the outside surface along the radial direction.

7. The canister filter system of claim 6 wherein the drain defines at least one vent passage and one liquid flow passage that are in fluid communication with the air pocket.

8. The canister filter system of claim 6 wherein the drain defines a vent passage and a liquid flow passage that are in fluid communication with the air pocket and the drain further comprises a partition between the vent passage and the liquid flow passage that is configured to keep liquid away from the vent passage.

9. The canister filter system of claim 6 wherein the drain defines a vent passage and a liquid flow passage and the canister defines a liquid reservoir and the liquid flow passage is positioned between the vent passage and the liquid reservoir along a radial direction from the longitudinal axis.

10. The canister filter system of claim 6 wherein the drain defines a liquid flow passage that is in fluid communication with the air pocket and the drain includes a stop that is configured to contact the end cap when closed and contact the canister when opened and the distance from the stop to the canister along the longitudinal axis is more than the distance from the stop to the entrance of a fluid flow passage along the longitudinal axis.

11. The canister filter system of claim 10 wherein the difference between the distances defines a gap between the drain and the end cap measured along the longitudinal axis.

12. The canister filter system of claim 8 wherein the drain includes a stop that is configured to contact the end cap when closed and contact the canister when opened wherein the height of the partition that is the minimum dimension measured along the longitudinal axis from the stop member to the top of the partition is greater than the distance that is the minimum dimension from the stop member to the canister when the drain is in the closed configuration measured along the longitudinal axis.

13. The canister filter system of claim 6 wherein the drain comprises a first end and a second end that are disposed along the longitudinal axis at opposite ends, wherein the drain defines at least one vent passage and at least one liquid flow passage and its first end includes attachment structure and the second end includes an anti-capillary flow feature that is configured to limit the flow of liquid from the liquid flow passage to the vent passage.

14. The canister filter system of claim 6 wherein the drain defines at least one vent passage and at least one liquid flow passage and a side vent opening and the liquid flow passage is positioned between the side vent opening and the vent passage along the radial direction.

15. The canister filter system of claim 13 wherein the anti-capillary flow feature comprises a concave surface.

16. The canister filter system of claim 6 wherein the drain defines a longitudinal bore that is concentric with the longitudinal axis that is configured to act as a vent passage.

17. The canister filter system of claim 6 wherein the drain defines at least one vent passage and at least one liquid flow passage that extend solely along the longitudinal axis.

18. The canister filter system of claim 17 wherein the liquid flow passage defines a polygonal perimeter.

19. The canister filter system of claim 6 wherein the drain defines a plurality of liquid flow passages and further comprises a funnel member that is configured to collect flow from each of the passages.

20. The canister filter system of claim 6 further comprising a base that includes an inlet channel for allowing fluid into the canister filter system and an outlet channel for allowing fluid out from the canister filter system and attachment structure for allowing the attachment of the canister.

* * * * *